A. HALECKI.
PRESSURE REGULATOR FOR STEAM BOILERS.
APPLICATION FILED MAY 9, 1911.
1,032,136.
Patented July 9, 1912.
2 SHEETS—SHEET 1.
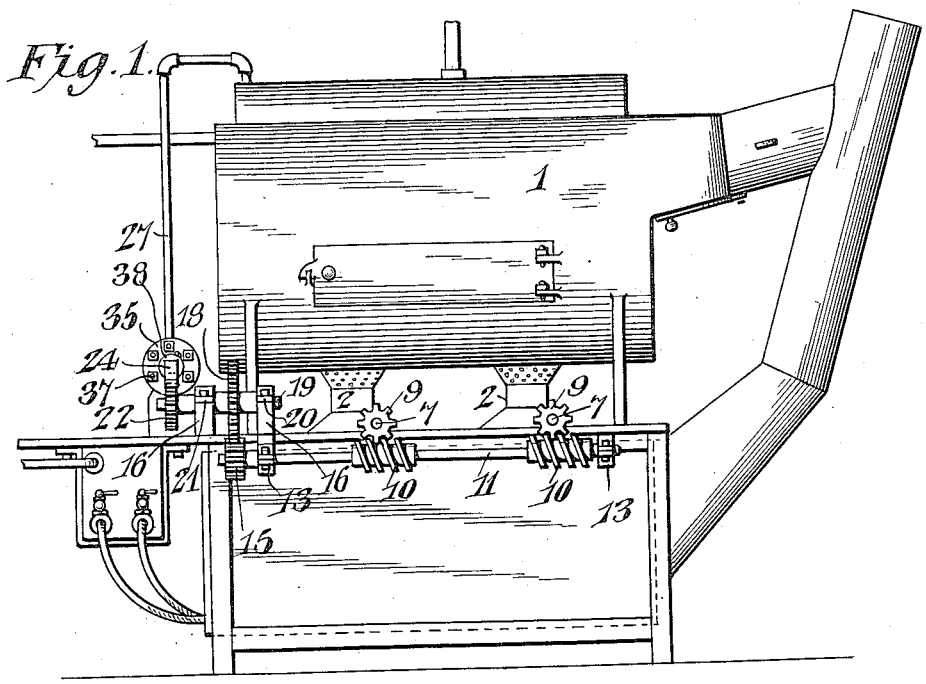
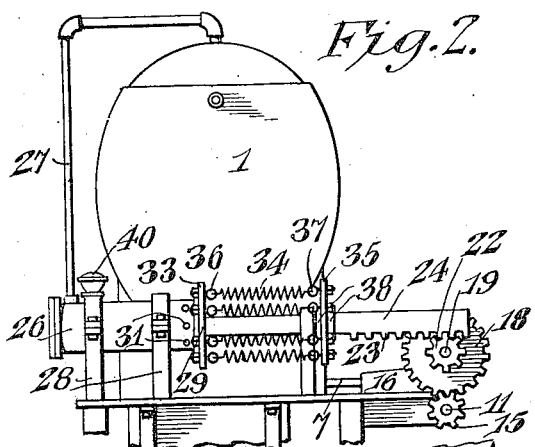
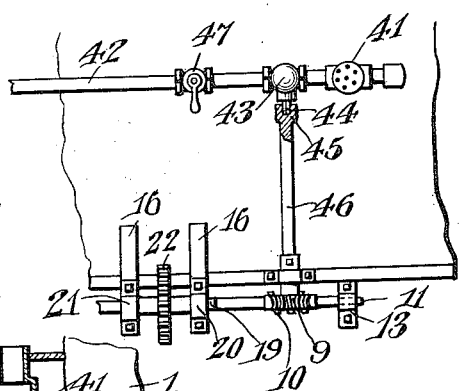
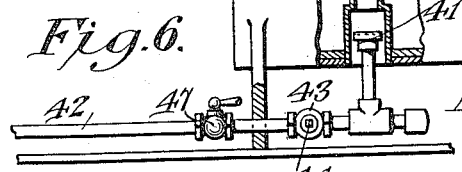
Alexander Halecki, Inventor

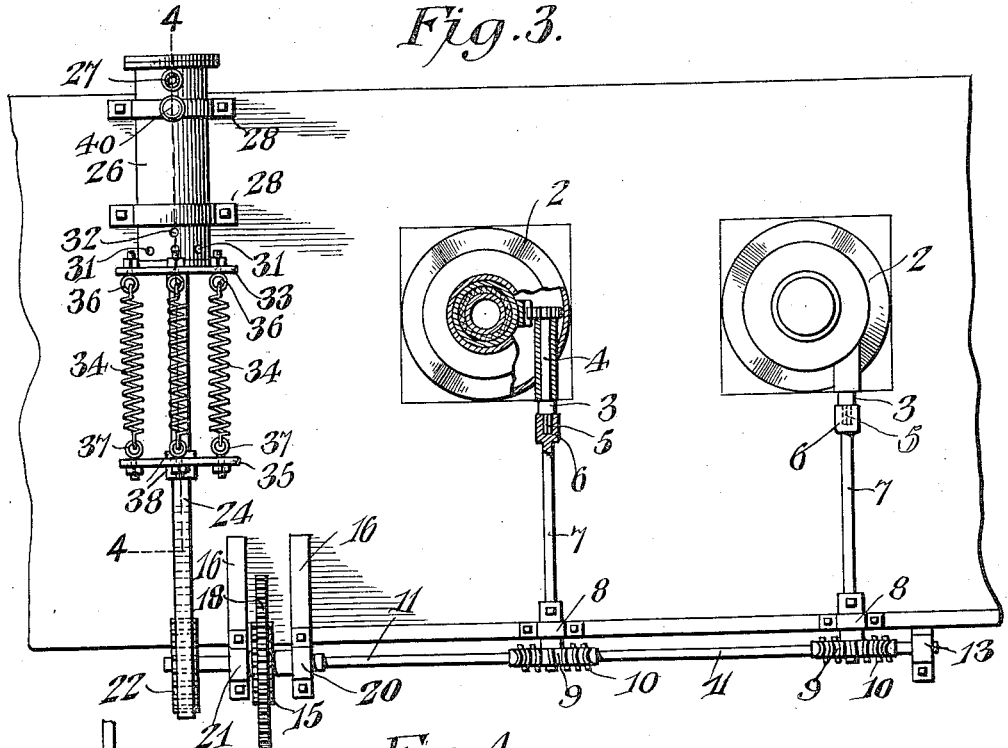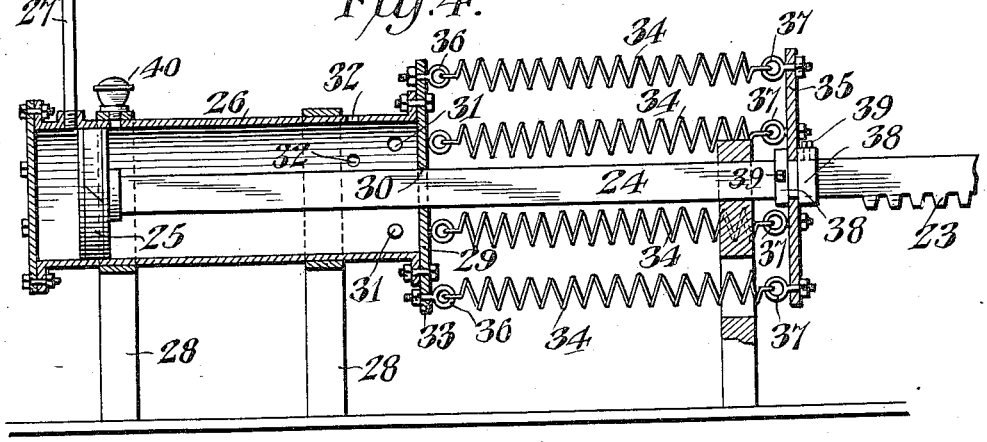

UNITED STATES PATENT OFFICE.

ALEXANDER HALECKI, OF BARNESBORO, PENNSYLVANIA.

PRESSURE-REGULATOR FOR STEAM-BOILERS.

1,032,136.   Specification of Letters Patent.   Patented July 9, 1912.

Application filed May 9, 1911. Serial No. 626,122.

*To all whom it may concern:*

Be it known that I, ALEXANDER HALECKI, a subject of the Emperor of Russia, residing at Barnesboro, in the county of Cambria and State of Pennsylvania, have invented a new and useful Pressure-Regulator for Steam-Boilers, of which the following is a specification.

The invention relates to improvements in pressure regulators for steam boilers.

The object of the present invention is to improve the construction of pressure regulators for steam boilers, and to provide a simple and comparatively inexpensive pressure regulator, designed for use in steam heating systems, and equipped with means for automatically controlling a plurality of burners, and capable of being readily adjusted to enable the desired steam pressure to be maintained within the boiler.

With these and other objects in view, the invention consists in the construction and novel combination of parts hereinafter fully described, illustrated in the accompanying drawings, and pointed out in the claims hereto appended; it being understood that various changes in the form, proportion, size and minor details of construction, within the scope of the claims, may be resorted to without departing from the spirit or sacrificing any of the advantages of the invention.

In the drawings:—Figure 1 is a side elevation of a steam pressure regulator, constructed in accordance with this invention. Fig. 2 is an end elevation of the same. Fig. 3 is a plan view partly in section. Fig. 4 is an enlarged sectional view on the line 4—4 of Fig. 3. Fig. 5 is a plan view partly in section, showing the regulator applied to a gas burner. Fig. 6 is a vertical sectional view of the same.

Like numerals of reference designate corresponding parts in all the figures of the drawings.

In the accompanying drawings in which is illustrated the preferred embodiment of the invention, the pressure regulator is shown applied to a steam boiler 1, forming the subject-matter of a companion application, executed of even date herewith. The boiler 1, as set forth in the said application, is heated by a plurality of lamps or heaters 2, provided with wick raising and lowering devices 3. The wick raising and lowering devices for controlling the burners may be of any desired construction, and their shafts or spindles 4 are provided with outer squared ends 5, which fit in sockets 6 of a plurality of operating shafts 7, disposed transversely of the boiler and mounted in suitable bearings 8. The inner ends of the operating shafts may be connected with the burner adjusting devices in any other desired manner, and they are provided at their outer ends with worm wheels 9, meshing with a plurality of worms 10, mounted on a longitudinal shaft 11. The longitudinal shaft 11 is journaled in suitable bearings 13 at one side of the support, and the said shaft 11 is provided at its front end with a pinion 15, which meshes with a gear wheel 18 of a short counter-shaft 19. The counter-shaft is journaled in suitable bearings 20 and 21 at the top of the support 16, and it is provided at its front or outer end with a pinion 22, which meshes with a rack 23 of a piston rod 24. The piston rod 24, which is square, is connected at its inner end with a piston 25, operating within a horizontal cylinder 26, arranged at one end of the boiler 1 and disposed transversely thereof and connected at one end with the same by a pressure pipe 27, extending from the cylinder to the top of the boiler and adapted to admit steam pressure back of the piston 25. The cylinder is supported by suitable standards 28, and it is provided at its outer end with a head 29, having a central squared opening 30 through which the piston operates and which prevents rotary movement of the piston, in order to maintain the teeth 23 of the rack in engagement with the pinion of the counter-shaft. The cylinder is provided adjacent to its outer end with vent openings 31 for the escape of air, and it also has adjacent to its outer end steam escape openings 32, which are uncovered by the piston when the latter is at the limit of its outward movement, and which operate as a safety valve to permit the steam to blow off before the pressure within the boiler becomes sufficiently high to be dangerous.

The head 29 projects beyond the cylinder to form an annular attaching flange or portion 33 to which are secured the inner ends of an annular series of spring coils 34, which are connected at their outer ends to a movable disk or head 35, carried by the piston rod. The inner and outer ends of the springs are detachably secured to the flange 33 and to the head 35 by eye bolts 36 and 37, piercing the flange and the head 35 and equipped with nuts. Any number of springs of the desired strength may be employed and by varying the number of springs and the strength thereof, the pressure within the boiler may be varied to suit the conditions of weather. The head 35, which is provided with a central opening to receive the piston rod 24, is adjustably mounted thereon by means of set collars 38, provided with set screws 39 and adapted to permit the head to be adjusted on the piston rod to place the springs under the desired tension. The cylinder is equipped with an oil cup 40 for lubricating the piston 25.

When the pressure within the boiler increases beyond a predetermined point, the piston is forced outwardly in the cylinder 26, and the rack of the piston rod rotates the pinion of the counter-shaft and motion is communicated through the gearing to the transverse operating shafts, which adjust the burners and reduce the head, and when the steam pressure is correspondingly reduced, the piston moves inwardly and the wicks of the burner are raised to their normal position. The springs are designed to be maintained under a certain tension, so that if the steam pressure should fall below a predetermined degree, the piston will be moved inwardly and will raise the wicks and increase the heat. By this construction, a constant pressure may be maintained within the steam boiler.

In Figs. 5 and 6, the pressure regulator is shown applied to a gas burner 41, connected with a gas pipe 42, which is equipped with a valve 43. The valve 43 is provided with a squared stem 44, which is fitted in a socket 45 of a transverse operating shaft 46, similar to those heretofore described. As the valve 43 will control the supply of gas to any number of burners, only one operating shaft 46 is necessary. The gas pipe 42 is also provided with a valve 47 to enable the flow of gas to be cut off by hand.

Having thus fully described my invention, what I claim as new and desire to secure by Letters Patent, is:—

1. The combination with a boiler, and a burner located beneath the boiler for heating the same, of a transverse operating shaft connected with the burner and extending to the front of the boiler, a longitudinal shaft arranged at the front of the boiler, gearing for connecting the said transverse and longitudinal shafts, a horizontal cylinder located at one end of the boiler and arranged transversely thereof and having a steam escape outlet at its outer end, a steam pressure pipe connecting the inner end of the cylinder with the boiler, a piston operating within the cylinder and located normally between the pressure pipe and the steam escape opening, a horizontal piston rod connected with the piston and extending from the outer end of the cylinder, exteriorly arranged springs lying beyond the cylinder and connected with the outer end thereof and with the piston rod, and means for transmitting motion from the piston rod to the longitudinal shaft.

2. The combination with a boiler, of a plurality of burners located at intervals beneath the boiler for heating the same, transversely disposed operating shafts extending outwardly from the burners and connected at their inner ends to the same, a cylinder located at one end of the boiler and arranged transversely of the same, a piston operating within the cylinder, a piston rod connected with the piston and extending from the cylinder and arranged transversely of the boiler and provided with teeth forming a rack, a longitudinal shaft located beneath the boiler at one side thereof, gearing connecting the longitudinal shaft with the outer ends of the operating shafts, and other gearing meshing with the rack of the piston and connected with the longitudinal shaft for communicating motion from the piston to the said longitudinal shaft.

3. The combination with a boiler, of a plurality of burners located beneath the boiler for heating the same, transversely disposed operating shafts extending outwardly from the burners and connected at their inner ends with the same, a cylinder located at one end of the boiler and arranged transversely with respect to the same and provided at one end with a steam escape outlet, a steam pressure pipe connecting the boiler with the other end of the cylinder, a piston operating within the cylinder and having a piston rod and actuated in its outward movement by steam pressure, a spring for urging the piston inwardly, a shaft located below the boiler and extending longitudinally thereof at one side of the same, and gearing arranged at intervals along the longitudinal shaft and connecting the same with the operating shafts and with the piston rod.

4. The combination with a boiler, and a plurality of lamps located beneath the boiler for heating the same, transverse operating shafts extending outwardly from the burners and connected at their inner ends with the same and provided at their outer ends with worm gears, a longitudinal shaft located below the boiler at one side thereof and provided with worms meshing with the worm gears, a cylinder located at one end of the boiler and arranged transversely of the same, a steam pressure pipe connecting the boiler with one end of the cylinder, a piston operating within the cylinder, a piston rod connected with the piston and extending from the cylinder and provided with teeth to form a rack, springs connected with the piston and with the cylinder, and gearing meshing with the rack of the piston and connected with the longitudinal shaft for rotating the same.

In testimony, that I claim the foregoing as my own, I have hereto affixed my signature in the presence of two witnesses.

ALEX. HALECKI.

Witnesses:
 CLAY C. STRAW,
 FRED RIDER.

Copies of this patent may be obtained for five cents each, by addressing the "Commissioner of Patents, Washington, D. C."